United States Patent [19]
Mayer et al.

[11] 3,910,769
[45] Oct. 7, 1975

[54] APPARATUS FOR FLUIDIZED SOLID SYSTEMS

[75] Inventors: Ivan Mayer, Summit, N.J.; Maurice A. Bergougnou, London, Canada

[73] Assignee: Exxon Research and Engineering Company, Linden, N.J.

[22] Filed: Dec. 11, 1973

[21] Appl. No.: 423,696

Related U.S. Application Data

[63] Continuation-in-part of Ser. No. 312,720, Dec. 6, 1972, abandoned, which is a continuation-in-part of Ser. No. 81,540, Oct. 16, 1972, abandoned, which is a continuation of Ser. No. 778,025, Nov. 20, 1968, abandoned, which is a continuation of Ser. No. 573,225, Aug. 18, 1966, abandoned.

[52] U.S. Cl. ............... 23/284; 23/288 S; 34/57 A; 75/9; 75/26; 423/148
[51] Int. Cl.² ..................... C22B 1/10; B01J 8/44
[58] Field of Search .......... 23/284, 288 S; 75/26, 9; 34/57 A; 423/148

[56] References Cited
UNITED STATES PATENTS

| | | |
|---|---|---|
| 2,394,814 | 2/1946 | Snuggs .................. 23/288 S X |
| 2,436,225 | 2/1948 | Ogorzaly et al. ............. 23/288 S |
| 2,471,034 | 5/1949 | Hall et al. .................... 23/288 S |
| 2,471,085 | 5/1949 | Wilcox et al. ............. 23/288 S X |
| 2,651,565 | 9/1953 | Bergman....................... 23/288 S |
| 2,690,962 | 10/1954 | Clarke ........................... 23/288 S |

*Primary Examiner*—James H. Tayman, Jr.
*Attorney, Agent, or Firm*—Joseph J. Dvorak

[57] ABSTRACT

Contacting apparatus chamber having a grid structure positioned therein, characterized by downwardly projecting frustoconic shaped nozzles, which extend below the lower face of the plate defining "dead spaces" in between the nozzles. The nozzle walls diverge at an angle no greater than 30° and preferably at an angle of about 3° to about 6°, measured from the vertical axis of the nozzle. This grid structure permits smooth flow of materials through the grid thereby avoiding fouling of the grid.

15 Claims, 8 Drawing Figures

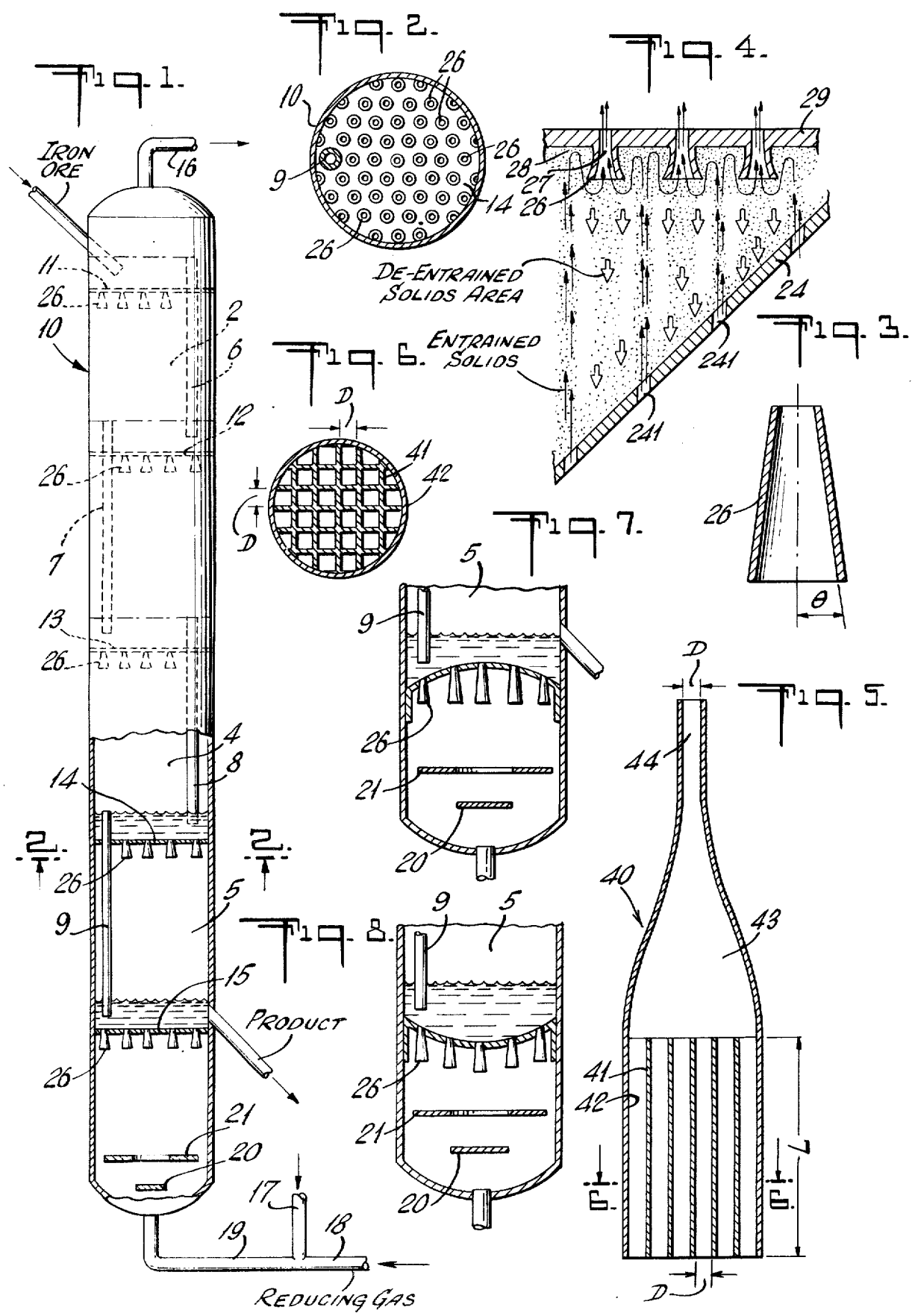

APPARATUS FOR FLUIDIZED SOLID SYSTEMS

CROSS REFERENCE TO RELATED APPLICATIONS

This application is a continuation-in-part of copending application Ser. No. 312,720, filed Dec. 6, 1972 and now abandoned which in turn is a continuation-in-part of Ser. No. 81,540, filed Oct. 16, 1972 and now abondoned. The latter application is a continuation of Ser. No. 778,025, filed Nov. 20, 1968 and now abandoned; which is a continuation of Ser. No. 573,225, filed Aug. 18, 1966, and now abandoned.

BACKGROUND OF THE INVENTION

This invention relates to the art of fluid-solids contacting, especially to distribution apparatus for carrying out chemical reactions between fluids and particulate solids. In particular, it relates to new and improved mechanical contacting devices for lessening the formation of deposits and for improving the gas-solids contacting characteristics in fluidized beds, especially in the beds of iron ore reduction processes.

In fluidized solids apparatus, a porous or perforated member is generally horizontally disposed or extended across the path of flow, or flow area, in a vessel for supporting the solids. Such members, generally referred to as grids, form a boundary between a gas or a dilute solids phase and a dense solids or emulsion phase constituting a fluidized solids bed. Fluids, e.g., gases, are injected through the grid from below to fluidized bed at the upper side of the grid.

Frequently baffles are used in fluidized solids apparatus for mechanical distribution of the fluids within the reactor. For example, baffles are often used within the bed of fluidized solids to redistribute the fluids within the bed thereby effecting better fluid solids contact. Most often, however, the baffles are located within the plenum chamber below the grid to distribute the fluids within the chamber as they enter.

Thus, grids are employed primarily to support the fluidized bed while baffles are employed primarily to effect a mechanical distribution of fluids within the reactor. Grids and baffles are further distinguished in that the pressure drop across grids is generally high whereas the pressure drop across a baffle is generally low.

In any event many processes are described in the art wherein grids and baffles are employed. These include, e.g., high and low temperature fluid coking operations, fluid hydroforming operations, various catalytic cracking operations, and the like.

A fluidized process of considerable importance is that relating to the direct reduction of iron ores. In a typical process, iron oxides are progressively reduced in a single vertical reactor having a series of reduction stages, each stage containing a separate fluidized bed of particulate oxidic iron ore at different levels of oxidation. A prepared particulate ore is fed into the top stage, the ore flowing continuously from one bed to the next bed or stage of the series, countercurrent to a flow of ascending hot reducing gas which consists generally of carbon monoxide or hydrogen, or mixtures thereof.

The individual beds are operated at the same or different elevated temperatures ranging generally from about 900°F. to about 1800°F., or more generally from about 1200°F. to about 1500°F. In the first stage, or stages, the oxides are preheated and reduced generally from the ferric oxide state to magnetic oxide or iron; in a subsequent stage, or stages, from magnetic oxide or iron to ferrous oxide; and finally, in a further stage, or stages, from ferrous oxide to substantially metallic iron. The reduced iron product, ranging generally from about 50 to about 95 percent metallization, is withdrawn from the final stage of the series, and is usually agglomerated or briquetted in a press. In some instances, a direct melting step is provided.

The problem of preventing grid fouling or plugging differs considerably from one type of fluidized process to another, and often the problem is more difficult to overcome in one process as opposed to another. This is particularly so as regards the problems encountered in the reduction of iron ores as contrasted with certain other fluidized processes. In fluidized iron ore reduction processes, such problems are especially acute. In fact, the problem differs drastically from one of the several stages of the fluidized iron ore reduction operation as compared with another. Major difficulties are associated with the ferrous reduction stage, or stages, i.e., that wherein the oxides are reduced, or partially reduced, from ferrous oxide to metallic iron. The problem is particularly acute where the ferrous reduction proceeds over a plurality of stages, and oddly enough, is most severe in the stages preceding the final reduction stage.

It has been postulated that "grid-hole plugging" or fouling is associated with adherence of the more finely divided metallic particles, i.e., "fines," to the surfaces surrounding the grid holes. The fines, ranging generally in size from about 325 mesh (Taylor series) and smaller, are blown into the openings and stick to the surfaces surrounding the grid holes or openings, gradually building up and forming deposits which obstruct further passage of gas. This, inter alia, results in high pressure drops across the grids and ultimately there is a necessity of complete shutdown to effect grid cleaning.

There are also other forces at work which, to some extent, tend to cause fines to percolate downwardly through the grid openings or perforations. The fluidizing medium, after passage through the grid and while within the bed, segregates from the solids as bubbles, i.e., areas of dilute solids phase concentration surrounded by solids particles in emulsion or dense phase concentration. One reason for this is that the fluidizing gas has a tendency, in its ascent through the reactor, to seek and follow a path lying at the center of the bed, and there the finer bubbles coalesce into larger bubbles. This gives rise to a "boiling" or pulsating action, and solids particles tend to reflux downwardly along the walls of the reactor toward the grid openings. The net effect of these phenomena is that it is very difficult, particularly in certain stages of the direct iron ore reduction processes, to prevent grid fouling.

SUMMARY OF THE INVENTION

According to the present invention there is provided a novel apparatus contemplating a plate or grid of special construction for horizontal location across a flow area. The plate is provided with an array or plurality of apertures or openings upon which are aligned downwardly diverging nozzles which extend beyond the lower face of the plate, the individual nozzles being spaced sufficiently far apart as to leave void or "dead spaces" on the lower or under side of the plate above the entry portions of the nozzles.

The nozzle walls diverge at an angle no greater than 30°, for example between 2° to 30°, as measured from the vertical axis of the nozzle. Preferably, the nozzle walls diverge at an angle of from 2° to 15° and more preferably from about 3° to about 6° as measured from the vertical axis of the nozzle. The effect of the diverging nozzle walls is to provide a smooth flow path that sweeps solids away from the nozzle walls preventing their sticking to the grid thereby fouling it. For example, the gases with entrained solids which are heading generally upwardly into the dead spaces between the nozzle openings are affected as follows. The gas is forced to alter its original direction of flow so as to enter the nozzles. The entrained solids, on the other hand, have sufficient momentum or inertia to continue on in their initial direction and enter the dead spaces between the nozzles. The solids tend to strike or approach the grid plate, but ultimately are forced to descend, and eventually enter the nozzles or descend to become disentrained.

The sharp turns formed by the walls at the nozzle entrances will alter the normal solids flow profiles. Due to the change in direction of the solids which enter the nozzles, most of the solids will flow upwardly near the vertical axis of the nozzle but will not ascend at locations near the nozzle walls. Thus, near the nozzle walls there is produced a centrifugal acceleration which causes disentrainment of the solids. These disentrained particles do not impinge on nor stick to the walls. On the other hand, the particles which move through the centers of the nozzles have no chance of sticking by contacting the walls of the nozzles.

In one embodiment of the present invention there is contemplated the use of baffles in combination with the novel grid disclosed and claimed herein. The baffles generally will have the configurations of discs, doughnuts or combinations of both.

Further, in another embodiment, a recovery deck or platform is provided by means of which disentrained solids can be continuously removed. The gas-solids flow can also be directed. For example, in normal operation, wherein a recovery deck is provided, gas with entrained solids jets upwardly through the holes on the recovery deck toward the dead spaces of the plate. At the bottom of the plate, near the entrance to the nozzles, solids are thrown outwardly and are reentrained to move upwardly through the center of the grid holes or are disentrained. In this manner the tendency toward plugging is eliminated or drastically suppressed.

In yet another embodiment, the entrances to the nozzles are provided with vortex breakers, or structures having a series of separate channels through which the gases enter. These provide structures having a honeycomb-like appearance which further smooths out flow through the nozzles. Preferably, the vortex breakers are constructed of a series of parallel plates or baffles spaced apart and vertically aligned upon the central axis of a nozzle, or aligned generally in the direction of flow through the nozzles. Preferably, also, this series of plates is intersected at regularly spaced intervals by another series of vertically-aligned plates, thus creating a plurality of independent flow channels at the entrance to a nozzle. The length: diameter (L/D) ratio of the individual honeycomb openings or channels ranges from about 10 to about 30, and preferably from about 15 to about 25. The diameter or cross-section of an individual opening through the honeycomb structure is preferably as large as, or larger than the minimum grid opening of the nozzles to which it is attached. In addition, preferably the forward portion of the nozzle containing the vortex breaker is constituted of a straight run section, or sections, the walls of which neither converge nor diverge, to provide a minimum wall area for impact of solids. Downstream of the vortex breaker is provided gradually converging walls forming a transition zone which produce a gradually increasing rate of flow of gases through the nozzles.

These and other features of the invention will be better understood by reference to the following detailed description, and to the attached drawings to which reference is made in the description.

BRIEF DESCRIPTION OF THE DRAWINGS

FIG. 1 is a schematic elevation view depicting a reactor containing a multiple number of fluidized beds, each bed being separated, one from another, by a grid structure of a type defined by the present invention; and also showing baffle means in conjunction therewith;

FIG. 2 is a plane view taken along Section 2—2 of FIG. 1 showing, from the bottom, one of the grid structures of the character generally described;

FIG. 3 is a schematic diagram showing a nozzle of the grid structure described herein and the divergence of the nozzle walls from the vertical axis of the nozzle;

FIG. 4 is an elevation view of a segment of a plate and recovery deck showing in detail the characteristics of the downwardly-diverging nozzles which are dispersed or arrayed across the diameter of the plate and the positioning of the recovery deck;

FIGS. 5 and 6, respectively, show elevation and plan views of a further refined nozzle provided with a vortex breaker at the gas entrance; and FIGS. 7 and 8 respectively, show schematic side views of a section of a fluid bed reactor having convex and concave grid structures of a type defined by the present invention.

DETAILED DESCRIPTION OF THE INVENTION

While the invention will be described with particular reference to a multi-bed reactor, the invention is equally applicable to a plurality of single bed reactors as well.

Referring now specifically to FIG. 1 there is shown a vertical reactor 10 of the type employed in the direct reduction of iron ores. Particulate iron ore solids are fed into the initial stage (stage 1) and the reduced iron ore is removed from the bottom or final stage (stage 5) of the reactor 10. Hot reducing gas is fed into the bottom of reactor 10 via line 19 to fluidize the solids and spent reducing gas is removed from the top of the reactor 10 via line 16.

The reactor 10 is divided into a series of stages — viz., 1 through 5 — each of which contains a fluidized bed of oxidic iron ore. Each of the stages are separated, one from another, by means of grids 11, 12, 13, 14, 15 through which ascends a hot stream of reducing gas which fluidizes the particulate iron oxide solids which are supported above said grids. While the grid is placed substantially horizontally across the enclosing walls of the reactor the grid plate need not be perfectly flat but may, for reasons of strength, be convex or concave in shape such as is shown in FIGS. 7 and 8 respectively.

In reactor 10 baffle means, shown as disc 20 and doughnut 21, are located in the plenum chamber below grid 15 to distribute the flow of gases. If interstage cyclones are employed above each bed, baffles may be used below any or all of the grids to distribute the flow of gases and entrained solids. Similarly baffles may be used below the grids where individual reactors are used in lieu of a multiple bed reactor system.

As indicated previously, in one embodiment perforated or recovery decks (not shown in FIG. 1) are provided below each of the grids 11, 12, 13, 14, 15, respectively, for removal of disentrained solids particles. These particles can be bled out through openings (not shown) in the walls of the reactor 10.

Iron ore is charged into the top of reactor 10, and into stage 1 which, most often, is a low temperature preheat zone where little or no reduction takes place. The preheat ore from stage 1 is flowed downwardly via a standpipe 6 to zone 2 which is operated at a temperature sufficient to reduce ferric oxide to substantially magnetic oxide of iron, or a mixture approximating the formula $Fe_3O_4$. The partially reduced solids are overflowed from stage 2 via a standpipe 7 to stage 3 wherein the magnetic oxide of iron is converted to substantially ferrous oxide. Ferrous oxide from stage 3 is overflowed via standpipe 8 to stage 4, and from stage 4 via standpipe 9 to stage 5, the final stage of the series.

Stage 4, the stage wherein relatively highly reduced iron particles contact the grid, is the stage wherein grid fouling is most acute because metallized particles are blown upwardly from stage 5 below into grid 14, these particles tending to aggravate the problem of pluggage. For the same reason there is also considerable tendency for the grid 13 to become plugged. Thus, relatively simple grids might be employed in the very upper stages, if desired, since the very last stages of the series are most readily and acutely disturbed by grid pluggage and fouling. Grids 11, 12 can thus be of more simple construction, or grids 13, 14, 15 can also be used at these locations.

The reducing gas, which is a reactant as well as a fluidizing medium, fed into reactor 10 via line 19 can be a fresh reducing gas consisting essentially of a mixture of carbon monoxide and hydrogen such as formed by partial oxidation of hydrocarbons or by the steam reformation of hydrocarbons, or a reducing gas from an entirely different source. Reducing gas from the top of reactor 10, which exits therefrom via line 16, can be regenerated by removal of oxidized components, if desired, and reintroduced via line 17 with fresh make-up gas which enters the reactor 10 via lines 18, 19 from a reducing gas "generator" (not shown). The reducing gas can be regenerated by generally conventional means, e.g., by scrubbing with an adsorbent to remove the carbon dioxide, or by refrigeration to remove water, or both.

As can be seen from FIGS. 1 and 2 the grid plate is provided with a plurality of openings, preferably symmetrically distributed across the plate, to best control and regulate gas and solids flow. Each of the openings is provided with downwardly diverging nozzles 26. The sides of the nozzles form enclosing walls which converge into an aperture to form a fructo-conic opening 27 which faces downwardly when the plate is in place in reactor 10. As can be seen from FIG. 3, the side wall of each nozzle diverges at an angle $\theta$, as measured from the vertical axis of the nozzle, which angle is no greater than 30°, preferably between 2° and 15°, and more preferably between about 3° and about 6°. Optionally, the nozzles can have smooth downwardly diverging walls thereby terminating in a horn or bell shape.

In general, the openings to the cones under the grid represent greater than about 5% of the total area of the grid. Indeed, the usual range of open area is from about 5 to about 30% with 10 to 20% open area being preferred.

In normal operation the flow of gases and solids is upwardly through the central portion of the nozzle. Between the nozzles 26, in spaces 28, below the plate 14 for example, are located dead spaces wherein the rising gas is blocked and forced to descend around the walls of nozzles 26 to enter openings 27. The sharp turn causes some of the solids to be deentrained due to the centrifugal acceleration of the gases but the solids which are re-entrained rise upwardly through the center of the openings without contact with the walls of nozzles 26.

In one embodiment of this invention, as shown in segment in FIG. 4, a perforated platform or recovery deck is located below the grid and conveys disengaged solids particles to the side of the reactor 10 from where they can be discharged via openings (not shown). The perforations 241 permit passage of gas, with entrained solids. The perforations 241 are preferably located directly below the dead spaces so that entrained solids will not impinge directly upon the inside walls of the nozzles 26. Fluids leaving orifices or nozzles do not diverge very rapidly. Solids contained in such gases, on the other hand, hardly diverge at all. Thus, the solids will tend to continue in the upward direction toward the flat part of the grid plate between the grid nozzles, whereas the gases will tend to enter directly into the grid nozzles, although some of the gases will approach the flat portion of the grid plate.

The angle of slope of a platform 24 is sufficiently great to permit free flow of solids particles down the walls. The angle of the platform 24 must be greater, or steeper, than the angle of repose, i.e., the angle required to overcome the internal friction of the solids. For iron oxides, the angle must be at least about 60°, and preferably ranges from about 60° to about 80°, measured from horizontal. The size of the openings 241 for upward passage of gases is determined by the throughput of gases to be handled in the reactor 10, but preferably are oversized to lessen any undue pressure drop within the reactor 10. Low pressure drops, and thus relatively low velocities (less than about 15 to about 25 feet per second), eliminate fouling of these holes. Thus, for a reactor operating at gas velocities of about 4 feet per second, these perforations 241 constitute about 10 to 25 percent of the cross section of the vessel. Operating with these perforated platforms permits considerably higher entrance velocities into the nozzles. These latter velocities can approach 50 feet per second but preferably the entrance velocity at the nozzle inlet is less than 30 feet per second.

In FIG. 4 the walls of the nozzle are shown curving downwardly and outwardly from wall 29 terminating in a bell or horn shape and thereby providing a streamlined entrance shape that minimizes fluid flow distortions.

In conventional grid hole openings the vena contracta is within the grid plate itself. The gas flow coming from below the grid plate passes the bottom rim of the grid hole, separates from the grid hole wall (vena contracta) and fans outward again after the vena contracta to reattach to the wall of the grid hole. Small particles follow the gas around the vena contracta. Due to their inertia, these particles cannot "reattach" to the walls as the gas does and therefore impinge against the upper part of the grid hole forming a saucer-shaped deposit. Further, particles falling downwardly from the bed above often enter into this low velocity zone and tend to contact the periphery of the openings to stick and produce plugging. The nozzles used according to the best practice of this invention, however, are provided with walls upwardly converging and optionally curving converging walls which provide a definite rate of change of gas velocity per unit of length.

The gas velocity profile will be nearly normal, but the solids velocity profile will be relatively higher at the center of the nozzles than normally encountered at the entrances. The concentration of solids due to the centrifugal action of making the turn will be higher at axis of the nozzle but lower near the walls than normally encountered for conventional gas entrances. The velocity profile of an upwardly converging nozzle will be somewhat higher at the walls than for a straight tube for the gases but the solids velocity will be considerably higher at the center line due to initial entrance effects. The net effect is that solids particles are either disengaged so that they will not contact solids surfaces or are thrown into the faster moving stream at the center of the nozzle. This phenomena is depicted with particular reference to the embodiment represented in segment in FIG. 4.

The nozzle design, illustrated by specific reference to FIGS. 5 and 6 (section 6—6 of FIG. 5), is especially useful in imparting better flow characteristics to gases. The design is somewhat similar to that shown by reference to the preceding figures except that, primarily, the nozzle includes an optional, and desirable, straight run portion or entry portion within which is provided a vortex breaker. Thus, the nozzle structure 40 includes a vortex breaker, in the shape of a honeycomb structure 41, located within the inside wall 42. The angle of entry into the frustoconical portion is limited to less than a maximum of 30° with the vertical axis of the nozzle so as to minimize impact effects of the entrained solids. In other words, the frusto-conical portion has the same relative dimensions of the nozzle without the straight run or entry portion.

The honeycomb is constituted of two series of parallel spaced, vertically-aligned plates located within the wall 42 of the nozzle. The plates are fitted or meshed together to provide a plurality of individual channels or cross-sectional openings, in that instance square openings or channels, which have a flow area as great as, or greater than, an opening through the grid. The length-:diameter (L/D) ratio of the indivual honeycomb openings ranges from about 10 to about 30, and preferably from about 15 to about 25. The cross-sectional area of an individual opening through the honeycomb structure is preferably as large, or larger, than the opening D which approximates that of the grid opening to which the nozzle is attached. The honeycomb 41 reduces or destroys large turbulent eddies and forces the gases to enter into the nozzle in a more vertical direction, and also reduces angular momentum and swirling.

Downstream of the honeycomb 41 is located a transition zone 43 wherein entrained solids particles are oriented and directed in a straighter flow path for smooth entry into the acceleration zone 44. The walls 42 of the transition zone 43 are inclined to provide a desired and definite rate of change of velocity per unit of length. The rate of change is set to minimize the effects of solids impaction.

The transition zone 43 is shaped to give a smooth entry into the modified frusto-conical nozzle and should have a minimum length of 6 times the diameter of the tube outlet. This transition length should not be greater than 20 times the diameter and preferably should range between about 10 to about 15 times the diameter D.

In accordance with this invention the gas and solids acceleration pattern is the critical feature to be incorporated to prevent solids sticking against the wall of the nozzle. The gases and solids should enter the vortex breaker at relatively low velocities. This portion of the apparatus smooths out and minimizes the eddies of solids and gases entering the nozzle. The transition zone is shaped so as to result in minimum distortion of the smooth flow established by the vortex breaker, yet designed to prevent excessive solid impingement on the walls of the transition zone.

Having established smooth entrance conditions to the nozzle by use of the vortex breaker and transition zone, the design of the nozzle itself is the most critical portion of the present invention. The nozzle is so designed as to give the solids contained in the gases sufficient time to accelerate and approach the velocity of the gases at the point where the gases and solids leave the nozzle. Thus, the maximum rate of change of gas velocity with length of travel down the nozzle is not greater than a constant and is preferably a decreasing smooth function of the distance from the nozzle entrance.

It is apparent that certain modifications and changes can be made in the present invention without departing its spirit and scope.

What is claimed is:

1. An apparatus for use in fluidized solid system comprising:
   a vessel defining a flow path for said fluidized solids;
   means for introducing and means for removing said solids;
   means for introducing and means for removing fluidizing gases;
   a plate horizontally located across the enclosing walls of said vessel thereby forming a boundary for a fluidized solids bed, said plate containing a plurality of apertures therethrough;
   nozzles for each aperture in said plate having an outlet on the upper surface of said plate formed from walls surrounding said apertures, said nozzles extending downwardly below the lower face of said plate, said downwardly extending nozzles having walls diverging at an angle not greater than 30° as measured from the vertical axis of said nozzle, whereby a smooth flow path is provided so that most of the solids will flow upwardly near the vertical axis of said nozzles andd thereby avoid sticking and fouling of the grid.

2. The apparatus of claim 1 wherein a plurality of plates is provided forming boundaries for a plurality of fluidized solid beds and including means for passing said solids downwardly from bed to bed.

3. The apparatus of claim 1 wherein said walls diverge at an angle between 2° and 15° as measured from the vertical axis of said nozzles.

4. The apparatus of claim 1 wherein said walls diverge at an angle between about 3° and about 6° as measured from the vertical axis of said nozzles.

5. The apparatus of claim 1 wherein said nozzles are provided with straight wall entry portions within which is included a series of individual channels formed by honeycombed structures which reorient and smooth out the flow of gases of the fluid solid systems through the nozzles.

6. The apparatus of claim 5 wherein the individual channels through the honeycombed structure provide a length: diameter ratio ranging from about 10 to about 30 and wherein the cross-sectional diameter of an individual channel is at least as great as an individual aperture through the plate.

7. The apparatus of claim 6 wherein the length: diameter ranges from about 15 to about 25.

8. The apparatus of claim 1 including means for directing the upward flow of entrained solids essentially completely toward said plate to an area between said nozzles.

9. The apparatus of claim 1 including baffle means located below said plate for distributing the flow of fluid in said vessel.

10. The apparatus of claim 1 wherein said plate is convex in shape.

11. The apparatus of claim 1 wherein said plate is concave in shape.

12. The apparatus of claim 1 including means for directing the upward flow of entrained solids essentially completely toward said dead spaces whereby the normal solids flow profile is altered so that most of the solids will flow upwardly near the vertical axis of said nozzles.

13. The apparatus of claim 12 wherein the means for directing upward flow of entrained solids is a recovery deck provided with a plurality of apertures, said apertures being aligned with the dead spaces between the individual nozzles whereby the entrained solids flow upwardly through the apertures essentially completely toward the dead spaces of said plate.

14. The apparatus of claim 1 wherein said nozzles are provided with straight wall entry portions within which is included a series of individual channels formed by honeycombed structures which reorient and smooth out the flow of gases of the fluidized solids systems through the nozzles.

15. The apparatus of claim 14 wherein the individual channels in the honeycombed structure provide a length:diameter ratio ranging from about 10 to about 30 and wherein the crosssectional diameter of the individual channel is at least as great as an individual aperture through the plate.

* * * * *